LOGIC SOLVING MAGNETIC CORE CIRCUITS
Filed Dec. 28, 1956
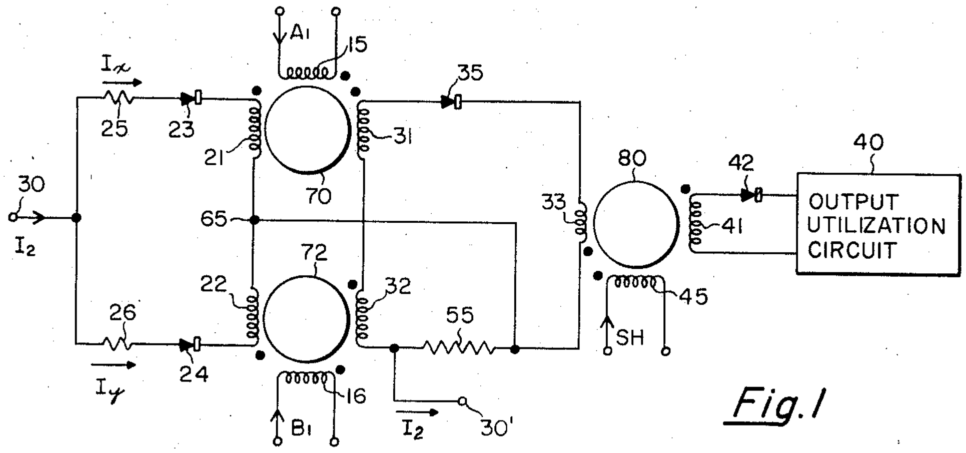
Fig. 1
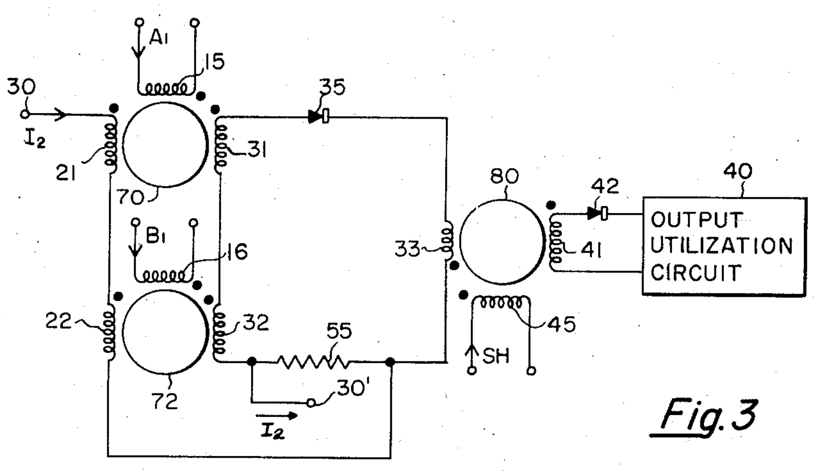
Fig. 3
| A | B | C |
|---|---|---|
| 1 | 1 | 1 |
| 0 | 0 | 0 |
| 1 | 0 | 0 |
| 0 | 1 | 0 |
Fig. 2
INVENTOR.
ALBERT J. MEYERHOFF
BY [signature]
ATTORNEY 2,904,780
Patented Sept. 15, 1959

2,904,780

LOGIC SOLVING MAGNETIC CORE CIRCUITS

Albert J. Meyerhoff, Wynnewood, Pa., assignor to Burroughs Corporation, Detroit, Mich., a corporation of Michigan Application December 28, 1956, Serial No. 631,298
6 Claims. (Cl. 340—174)

This invention relates to bistable state magnetic storage devices and more particularly to circuits which are adapted to perform logical operations on binary digits.

It is necessary in operating automatic electronic computing equipment to provide circuits for performing logical operations. For example in the performance of arithmetic manipulations in computer circuits, logical functions are frequently encountered which indicate the mixed presence and absence of a plurality of possible input signal pulses. Although large numbers of vacuum tubes are still used in electronic computers, bistable magnetic elements are finding increased application in logical operations because of their reliability, economy and longevity.

Static magnetic storage elements in general utilize core materials having substantially rectangular hysteresis loop characteristics wherein the storage elements tend to remain in a permanent magnetic remanence condition in response to the application thereto of a saturating magnetic flux. The storage state of such elements may be determined at any time by providing an interrogating saturation flux of a known polarity. The interrogating flux source induces a large signal voltage pulse in transformer windings about the core when the remanence condition is changed from one polarity to another. However, when the interrogating flux leaves the core in the same remanent condition, very little output signal is induced in such transformer windings. Thus, the storage state is compared with the known polarity of the interrogation flux.

This invention is directed to a particular type of logical circuit termed an "And" circuit. Such a circuit would include two input terminals to which are applied signal pulses and output terminals for yielding an output signal only when both input signals are present. There is no output from the "And" circuit under the following conditions, namely, if there is no signal input to either of the input terminals or if one of the input signals is present while the other is absent.

In accordance with the present invention, bistable magnetic storage elements are operated in a manner such that the "And" function is obtained reliably and quickly and with a minimum number of magnetic elements.

It is, therefore, an object of the present invention to provide improved magnetic circuits for performing logical functions.

A more specific object of this invention is to provide an "And" circuit utilizing magnetic binary elements.

Another object of this invention is to provide an improved "And" logical circuit which is more reliable by virtue of its low sensitivity to noise impulses.

Other features and objects of the invention will be described through the following detailed description of the invention and illustrated in the accompanying drawings, in which:

Fig. 1 is a schematic diagram of a logical "And" circuit embodying the invention;

Fig. 2 is a truth table for indicating the logic of the "And" function; and

Fig. 3 is a schematic illustration of another form of circuit embodying the instant invention.

Before proceeding with a detailed analysis of the circuit, it would be helpful to review the notation and background material used in connection with the schematic diagram. Thus, the information of opposite polarities to be stored in the binary elements is arbitrarily designated in the binary notation "1" and "0." The magnetic binary elements are shown as circles and it is assumed that these represent magnetic cores having essentially rectangular hysteresis loop characteristics.

Each of the magnetic cores is supplied with windings for producing a magnetic flux therein in response to current flow through these windings. Thus as current flows into a dotted winding terminal, the core associated with such winding will tend to store a "0." Conversely if the current flows into an undotted winding terminal, the core associated with such winding will tend to store a "1." The signals, storage conditions and currents are designated by appropriate letters supplied with subscript numbers which designate a relative time step. A definite sequence of time steps occurs during each sequential time period. For example, time steps denoted by the subscripts 1, 2 and 3, respectively, make up one sequential time period. Thus $A_1$ indicates the signal arriving at a binary magnetic storage element during the first time step of a sequential time period. Likewise $I_2$ indicates current flow in the second step of a sequential time period.

Referring now to Fig. 1, consider the circuit operation when both input signal pulses $A_1$ and $B_1$ are present. As a result of input signal $A_1$, current flows through winding 15 of element 70 in such a direction as to store a "1" in bistable element 70. Likewise current flowing through winding 16 of element 72 as a result of input signal $B_1$ stores a "1" in bistable element 72. Input signal pulses $A_1$ and $B_1$ may be applied simultaneously to read-in windings 15 and 16 of magnetic elements 70 and 72 respectively, or they may be applied to the read-in windings in any desired sequence at any time prior to the flow of interrogation current $I_2$.

In the second time step, interrogation current $I_2$ enters terminal 30 and divides into two branch currents $I_x$ and $I_y$. Current $I_x$ flows through resistor 25, diode 23, and interrogation winding 21 of magnetic element 70 to junction 65. Current $I_y$ flows through resistor 26, diode 24 and interrogation winding 22 of magnetic element 72 to junction 65. At the junction 65, which is common to windings 21 and 22, branch currents $I_x$ and $I_y$ recombine into current $I_2$ which subsequently flows through resistor 55 and thence back to the current source through terminal 30'.

Thus current $I_x$ flows into the dotted terminal of winding 21 of magnetic core 70, thereby tending to switch the core 70 toward its "0" remanent state. Current $I_y$ flows into the dotted terminal of winding 22 of magnetic core 72 and tends to switch the core 72 toward the "0" state. Diodes 23 and 24 are supplied in each current path to assure that current flows in a single direction through the two branch paths. The resistors 25 and 26 serve to equalize any slight unbalanced conditions caused by variations in circuit parameters.

As magnetic cores 70 and 72 are switched toward their respective "0" magnetic remanent states by currents $I_x$ and $I_y$, a voltage is induced across transfer winding 31 of core 70 and also across transfer winding 32 of core 72. The polarity of windings 31 and 32 is such that the voltages induced across each of the windings are additive. This resultant voltage is applied to diode 35, and is of sufficient magnitude to overcome the back bias voltage on the diode resulting from current $I_2$ flowing through resistor 55. The magnitude of the back bias is a function of the current $I_2$ and the value of resistor 55. For proper "And" circuit operation, the amount of back bias voltage must be such as to allow current to flow in the transfer loop comprising windings 32 and 31, diode 35, transferee winding 33 of magnetic core 80 and resistance 55, only when the amplitude of the forward voltage is indicative of the simultaneous switching of both magnetic cores 70 and 72 toward their respective "0" states. Or stated another way, the voltage induced across either winding 31 or 32 as a result of the switching of either magnetic core 70 or 72 toward the "0" remanent state must be insufficient to overcome the back bias on diode 35 so that current will not flow in the aforesaid loop. The function of resistor 55 will become more apparent as the circuit operation with various signal input conditions is hereinafter described in detail.

Thus in the case we are considering, namely, that both magnetic cores 70 and 72 are simultaneously switching toward their respective "0" magnetic remanent states, current is made to flow into the undotted terminal of winding 33 associated with output magnetic core 80. Assuming that core 80 is in the "0" state as a result of previous "read-out," the current flowing through winding 33 will switch core 80 to the "1" state.

During the third time step, shift signal pulse current SH is applied to the dotted terminal of winding 45 of core 80. The shift signal pulse is used to read the logical result from element 80 into the output utilization circuit 40 by way of winding 41 and diode 42. Read-out winding 41 and diode 42 are polarized to pass a signal only when element 80 is switched from its "1" state to its "0" remanent state. Thus, in the time sequence period under discussion, element 80 which had been switched to the "1" state in the second time step is read out or switched to the "0" state by the shift pulse SH, thereby inducing a voltage across winding 41 and producing an output to the utilization circuit 40.

The shift signal pulse SH may also be applied to winding 45 during the first time step of the succeeding time sequence period. By allowing the shift signal pulse, SH, to occur during the first time step, the entire logical operation can be completed in two time steps. As hereinbefore described, the transfer of binary information from magnetic elements 70 and 72 to element 80 can occur only during the second time step as a result of current $I_2$.

Assume that in the next time sequence period, input signals $A_1$ and $B_1$ do not exist. Magnetic elements 70 and 72 remain in their respective "0" remanent states. During the second time step, current $I_x$ and $I_y$ flow into the dotted terminals of windings 21 and 22 but produce no switching of magnetic cores 70 and 72 since these cores are already in their respective "0" remanent states. Consequently, the only voltages induced across windings 31 and 32 of magnetic cores 70 and 72 respectively are small noise voltages resulting from the non-squareness of the hysteresis loop characteristic of the magnetic material used for the cores. The sum of these noise voltages is not sufficient to overcome the back bias voltage on diode 35 which is provided by current $I_2$ flowing through resistor 55, and hence no transfer current flows through winding 33 of core 80. Thus the magnetic remanent state of core 80 which was cleared to the "0" state in the preceeding period remains unchanged. The subsequent application of a shift signal pulse to the dotted terminal of winding 45 produces no switching of the output core 80. Hence a switching voltage is not developed across winding 41 of core 80 and there is no output to the utilization circuit 40.

Assume that in the next time sequence period, input signal pulse $A_1$ is applied to winding 15 of magnetic element 70 and that input signal $B_1$ is not present. Thus magnetic element 70 is switched to the "1" state and element 72 remains in its "0" remanent state. During the second time step, current $I_x$ flows into the dotted terminal of winding 21 and switches element 70 toward the "0" state. Magnetic core 72 is already in the "0" state and the flow of current $I_y$ into the dotted terminal of winding 22 merely drives the core to saturation and produces a small noise voltage across winding 32. The switching of core 70 induces a voltage across its transfer winding 31. This voltage is of the proper polarity to cause current to flow into the undotted terminal of winding 33 of output core 80 but the voltage is not of sufficient amplitude to overcome the back-bias voltage on diode 35 produced by current $I_2$ flowing through resistor 55. Hence there is no transfer of information from core 70 to core 80 and the latter core remains in its "0" remanent state. The application of a shift pulse to winding 45 of core 80 produces no output to the utilization circuit.

Similarly, if in the next time sequence period, element 72 is switched to the "1" state by input pulse $B_1$ and element 70 remains in the "0" state, due to the absence of $A_1$, the voltage induced in winding 32 when element 72 is switched to the "0" state by current $I_y$ is insufficient to overcome the back-bias voltage on diode 35 and core 80 remains in its "0" remanent state. Consequently there is no output to the utilization circuit when the shift pulse is applied to winding 45 of core 80.

From the foregoing description, it will be noted that the value of $I_2$ and resistor 55 should be chosen to provide sufficient voltage to keep diode 35 cut off in the presence of the switching voltage developed across windings 31 or 32 when only either element 70 or 72 is switching toward its respective "0" remanent state.

The truth table of Fig. 2 depicts the logical "And" function. A and B are considered the input magnetic elements and correspond to bistable elements 70 and 72 in Figures 1 and 3. The "1" 's and "0" 's in the A—B columns of the table represent the magnetic states of the aforesaid elements as a result of the existence or nonexistence of signal input pulses $A_1$ and $B_1$. C represents the output magnetic element referred to as bistable element 80 in Figures 1 and 3. The "1" 's and "0" ' of the C column are indicative of the stored logical result in element C. As hereinbefore described a "1" is stored in bistable element C only when the two signal input pulses are present. According to the truth table, the absence of both input pulses or the application of an input pulse to only one of the input elements 70 and 72 result in no switching of the output core 80, and hence no output to the utilization circuit.

Figure 3 illustrates another form of circuit embodying the instant invention. The circuit operation of Fig. 3 differs from that of Figure 1 in the method of applying the interrogation current $I_2$ to windings 21 and 22 associated with input magnetic elements 70 and 72. Current $I_2$ enters terminal 30 and flows through a series path comprising windings 21 and 22, resistor 55 and thence back to the current source. The substitution of a series current path in Figure 3 for the split current path of Figure 1 results in the elimination of certain circuit elements, namely, resistors 25 and 26 and diodes 23 and 24.

From the description of the circuit operation it will be noted that when the shift current pulse applied to winding 45 switches magnetic core 80 from the "1" state to the "0" state, a voltage is induced across all the windings associated with core 80. Thus the voltage induced across winding 33 creates a noise current in the back loop comprising resistor 55, windings 32 and 31, diode 35 and winding 33. This current entering the non-dot terminals of windings 32 and 31 associated with magnetic cores 72 and 70, respectively, tends to switch these cores toward their respective "1" states. In actual practice, however, there is no switching of magnetic cores 72 and 70 since the current in the back loop as determined by the amplitude of the voltage induced across winding 33 and the combined series impedances of resistance 55, windings 31, 32 and 33 and diode 35 is smaller than the threshold current required for producing a change in the magnetic flux state of magnetic cores 72 and 70.

From the foregoing description of the invention and its mode of operation, it is evident that the logical "And" function may be derived advantageously with the improved binary magnetic circuit. Those features of novelty believed descriptive of the nature of the invention are therefore described with particularity in the appended claims.

What is claimed is:

1. A logic circuit comprising in combination a plurality of magnetic storage elements each having bistable states of magnetic remanence; an input signal winding coupled to each of said magnetic elements and adapted to be pulsed from a source of binary signals, whereby such signals cause said magnetic elements to assume one or the other states of magnetic remanence; an interrogation winding coupled to each of said magnetic elements and adapted to be pulsed simultaneously by interrogation current means for sensing the remanent state of each of said magnetic elements; a transfer winding coupled to each of said magnetic elements in which voltages are induced when the magnetic state of the storage element is switched by said interrogation current flow, said induced voltages tending to cause transfer current flow in a series loop comprising said transfer windings, a unidirectional current device and an impedance element; means coupling said impedance element in series with said interrogation windings so as to allow said interrogation current to flow through said impedance element and develop a bias voltage thereacross, said bias voltage being applied to said unidirectional current device to oppose current flow therethrough, said bias voltage being of sufficient magnitude to inhibit the flow of transfer current around said series loop except during the simultaneous switching of all of said plurality of magnetic storage elements by said interrogation means, and means for detecting the flow of transfer current around said series loop.

2. A circuit as set forth in claim 1 wherein said unidirectional current device is a diode connected in opposition to the bias voltage developed across said impedance element by the interrogation current flow therethrough.

3. A circuit as set forth in claim 1 wherein said impedance element is a resistor capable of supplying the required bias voltage for reliable circuit operations.

4. A logic solving system comprising in combination a plurality of magnetic elements each having an input signal winding, a transfer winding and an interrogation winding coupled thereto, each magnetic element being capable of assuming a predetermined first stable state in response to the presence of an input signal pulse applied to its input winding but retaining its other stable state in the absence of such input signal pulse; a first circuit for interrogating simultaneously the stable state conditions of all said magnetic elements and comprising an impedance element in series with said interrogation windings and means for driving interrogation current through said first circuit; a second circuit comprising in series said transfer windings, a unidirectional current device, and said impedance element, the last being common to both said first and second circuits, said impedance element developing, in response to the flow of interrogating current in the first of said circuits, a bias voltage which is applied to said unidirectional current device to oppose current flow therethrough, said bias being of sufficient amplitude to inhibit the flow of current in said second circuit except when the sum of the voltages induced in each of said transfer windings by the simultaneous switching of all said magnetic elements in response to said interrogation current is sufficient to overcome said bias voltage, thereby to cause current to flow around said second-circuit loop; and means for detecting the flow of current around said second-circuit loop.

5. A circuit for proving the logical "And" function comprising a pair of bistable magnetic elements; an input signal winding coupled to each of said elements, each element being capable of assuming a predetermined first stable state in response to the presence of an input signal pulse applied to one of said signal windings but retaining its other stable state in the absence of such input signal pulse; an interrogation winding coupled to each of said magnetic elements; means for sensing the stable state conditions of said elements, said sensing means including two parallel paths adapted to conduct interrogation current from a source, each path comprising a unidirectional current device and the interrogation winding associated with one of said pair of magnetic elements; an impedance element connected in series with said two parallel paths; transfer windings coupled to said magnetic elements and connected in series wherein the voltages induced as a result of the change in the stable state of the magnetic elements by said interrogation current flow are additive, said transfer windings being coupled in a transfer loop comprising in series said transfer windings, a diode and said impedance element, the said being common to both the interrogation current circuit and said transfer loop, said impedance element developing a bias voltage in response to the flow of interrogation current therethrough, said voltage providing a back-bias for said diode sufficient to prevent the flow of current in the transfer loop in response to the voltage induced in but one of said transfer windings during the change of state of one of said magnetic elements during interrogation, but insufficient to prevent current flow in said transfer loop in response to the cumulative voltage developed across both said transfer windings during the simultaneous change in state of both said magnetic elements; and means for detecting the flow of transfer current when such simultaneous change in state occurs.

6. An "And" logical circuit comprising in combination three bistable magnetic storage elements, each element capable of assuming different states of magnetic remanence representative of the binary "zero" and "one" conditions; an input signal winding coupled respectively to the first and second of said magnetic elements for receiving binary information; an interrogation winding and a transferor winding coupled to each of said first and second magnetic elements, said interrogation windings being adapted to be pulsed simultaneously from an interrogation current source to sense the magnetic state of each of said elements, said transferor windings being connected in series with each other and also in series with a unidirectional current device, a transferee winding coupled to the third of said magnetic elements, and an impedance element, said impedance element being connected also to said interrogation current means by way of said interrogation windings whereby a bias voltage is developed across said impedance element in response to interrogation current flowing therethrough, said bias voltage being applied to said unidirectional current device to oppose current flow therethrough and having a magnitude to prevent current from flowing through said transferee winding on said third magnetic element except during the simultaneous change in state of both said first and second magnetic elements, in which case the total voltage induced across said transferor windings is sufficient to overcome said bias and permit current to flow through said transferee winding causing said third magnetic element to assume a predetermined storage state indicative of the logical "And" function; and means to detect the predetermined storage state of said third magnetic element.

References Cited in the file of this patent

UNITED STATES PATENTS 2,708,722 Wang ---------------- May 17, 1955

OTHER REFERENCES

"Thesis on Magnetic Cores," by M. K. Haynes, Dec. 28, 1950, pp. 21–28, 36–45.

UNITED STATES PATENT OFFICE

CERTIFICATE OF CORRECTION

Patent No. 2,904,780 September 15, 1959

Albert J. Meyerhoff

It is hereby certified that error appears in the printed specification of the above numbered patent requiring correction and that the said Letters Patent should read as corrected below.

Column 5, line 39, for "flow" read -- flowing --; column 6, line 18, for "said" read -- last --.

Signed and sealed this 29th day of March 1960.

(SEAL)

Attest:

KARL H. AXLINE

Attesting Officer

ROBERT C. WATSON

Commissioner of Patents